Oct. 20, 1970    G. R. DICKINSON    3,535,662
STEP-BY-STEP ROTATABLE TELEVISION TUNER WITH ROTOR
HAVING FLAT CONTACTS PARALLEL TO ROTOR'S AXIS
Filed April 4, 1968    6 Sheets-Sheet 1

Inventor
George R. Dickinson
By James E. Tracy
Attorney

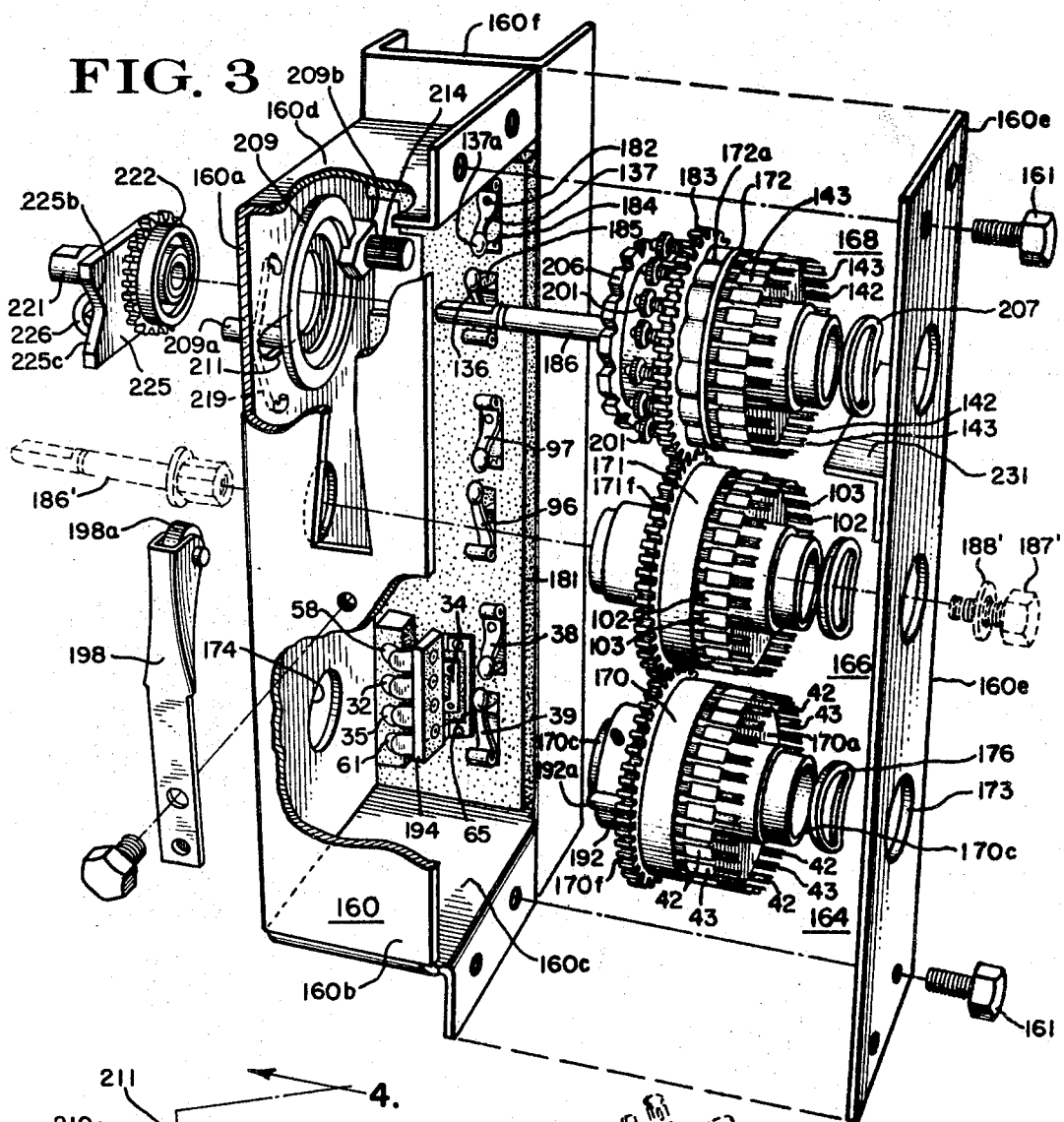

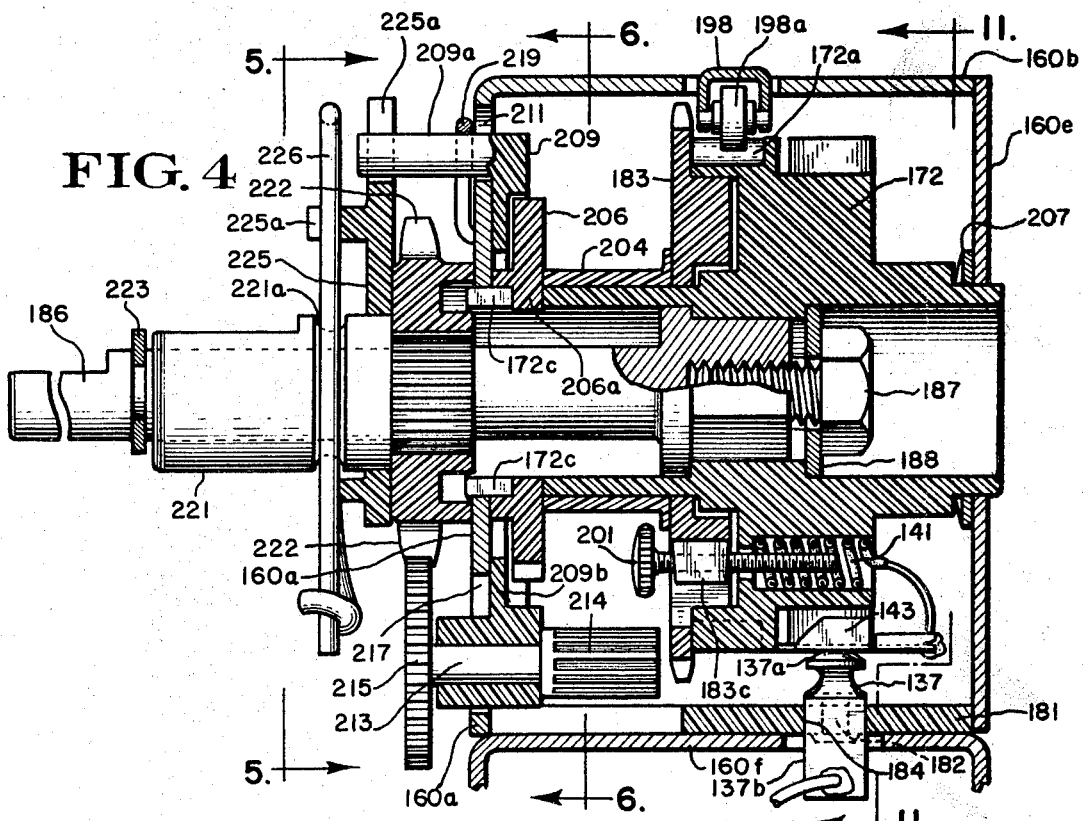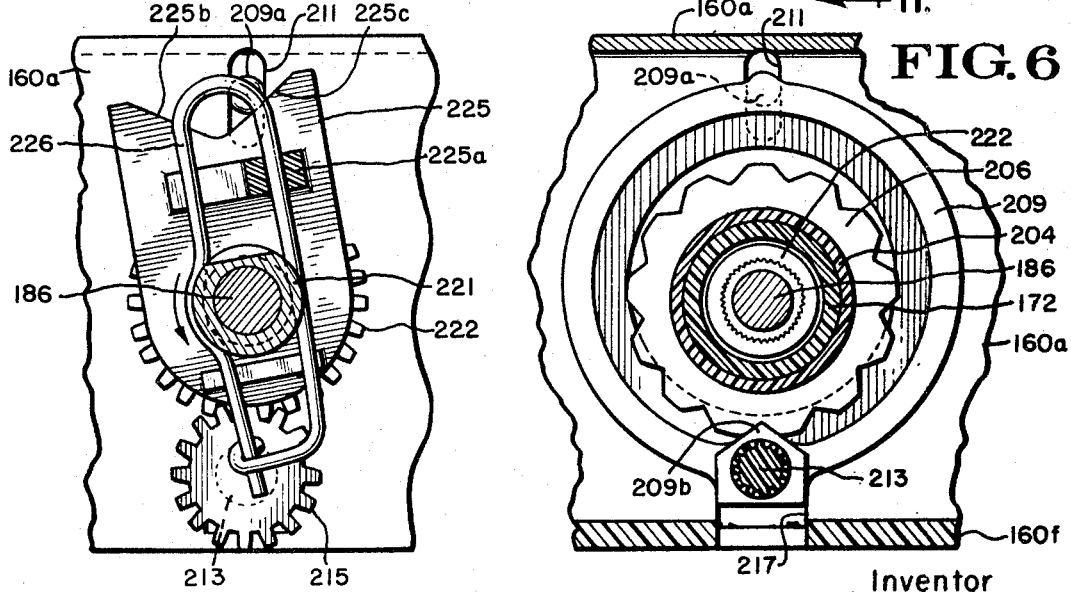

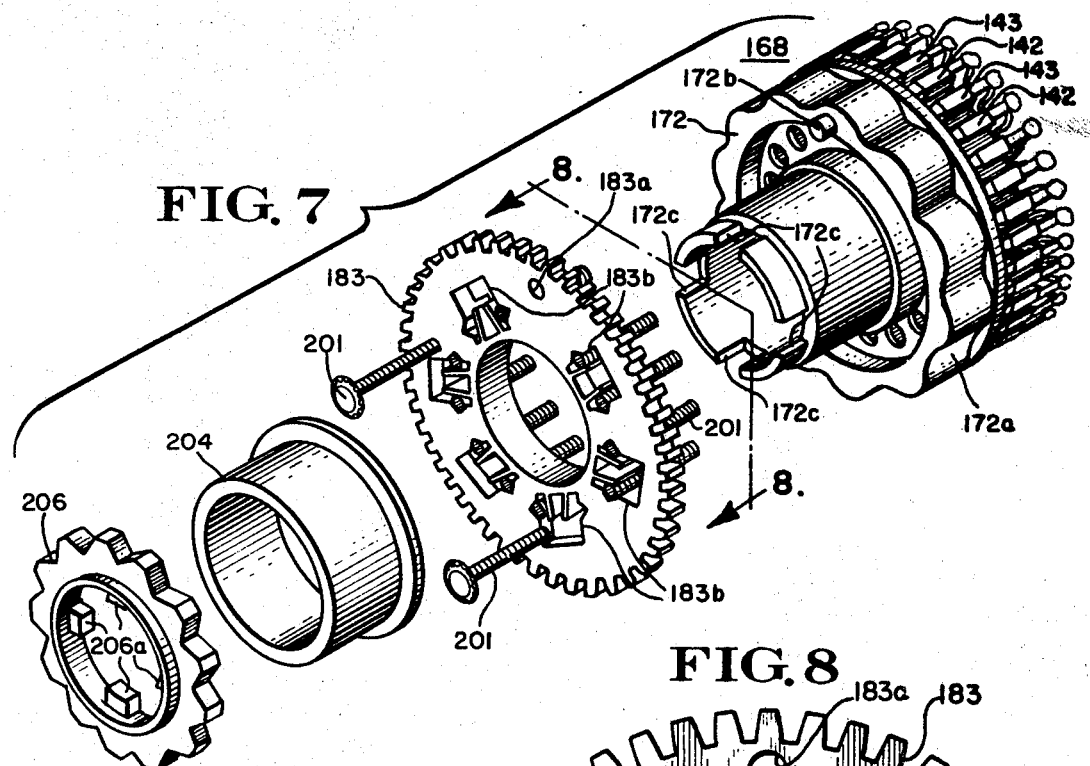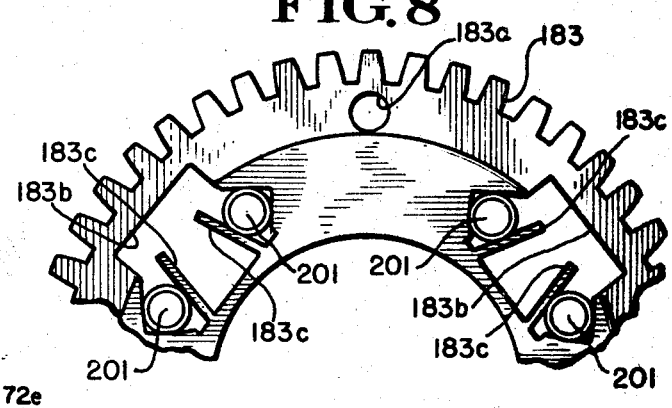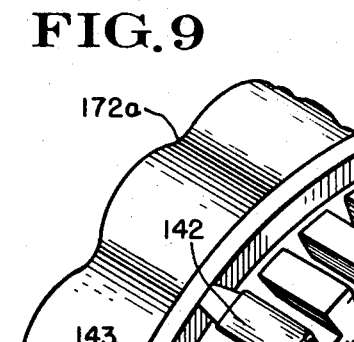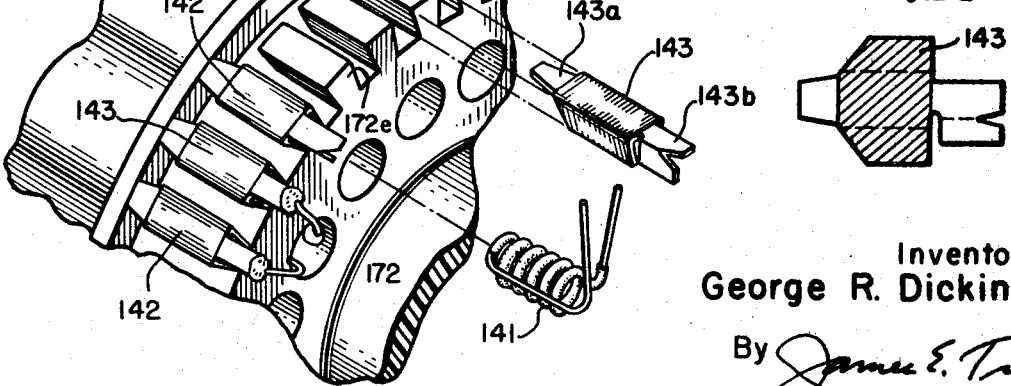

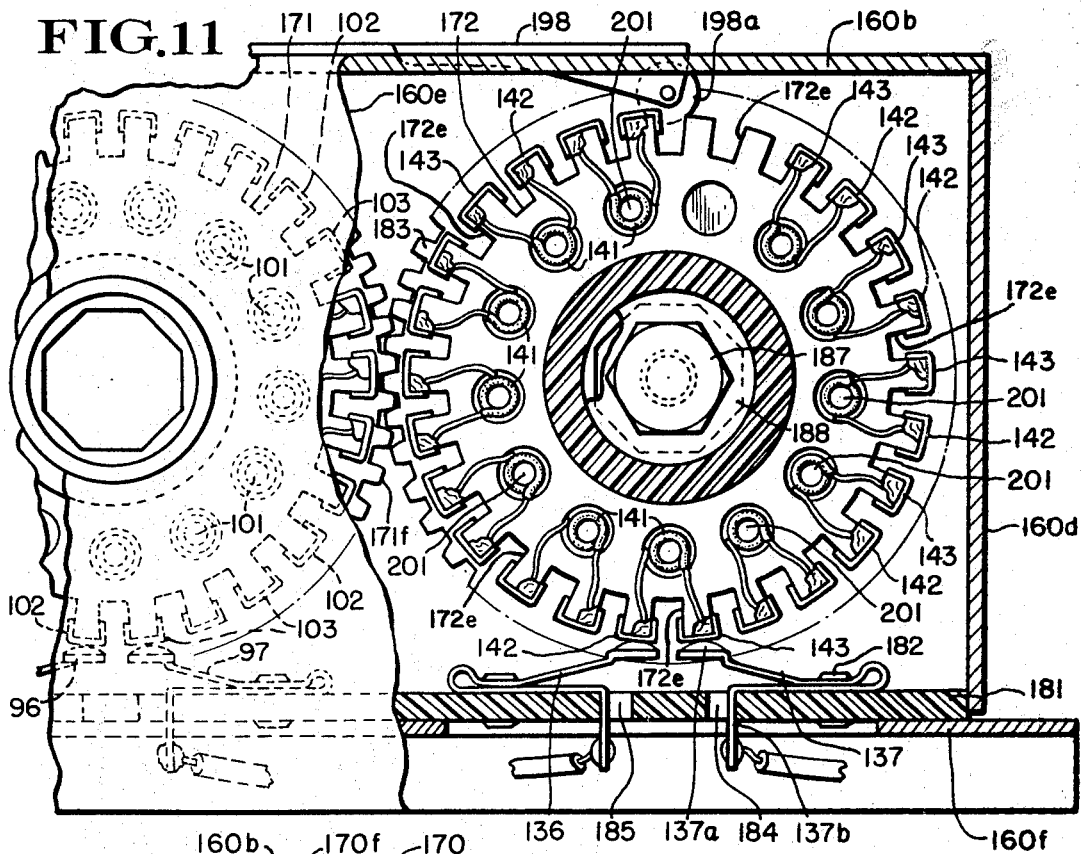
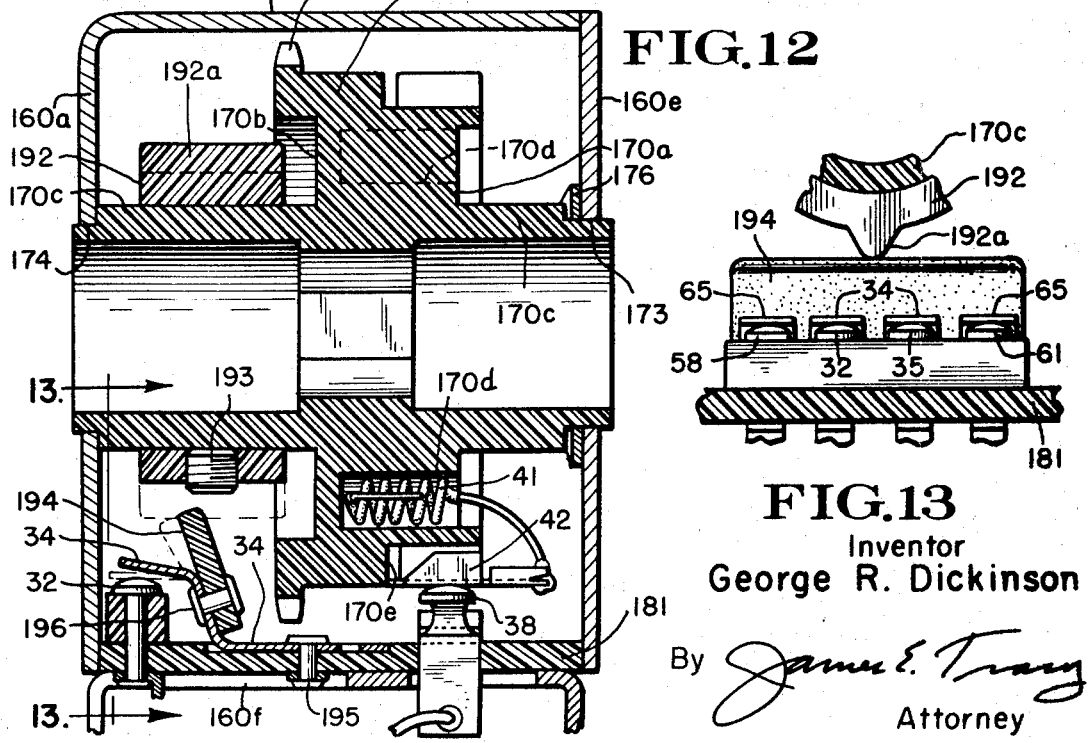

Inventor
George R. Dickinson
By James E. Tracy
Attorney

United States Patent Office 3,535,662
Patented Oct. 20, 1970

3,535,662
STEP-BY-STEP ROTATABLE TELEVISION TUNER WITH ROTOR HAVING FLAT CONTACTS PARALLEL TO ROTOR'S AXIS
George R. Dickinson, Norridge, Ill., assignor to Zenith Radio Corporation, Chicago, Ill., a corporation of Delaware
Filed Apr. 4, 1968, Ser. No. 718,839
Int. Cl. H01h 1/02, 19/58; H03j 5/30
U.S. Cl. 334—1                   1 Claim

ABSTRACT OF THE DISCLOSURE

Included in a VHF tuner are three rotatably mounted plastic rotors mechanically intercoupled so that they may be step-by-step rotated in unison. Each rotor has a pair of faces normal to its axis of rotation, and a series of cavities or wells formed therein and each having an opening on the same face. Disposed in respective ones of the cavities are a corresponding series of inductance coils each of which has its two terminal leads extending through its cavity opening for connection to an assigned pair of rotor contacts mounted around the rotor's periphery and each having a flat contact surface parellel to the rotor's axis. In each tuner position, the contact surfaces of a different pair of contacts of each rotor engage and establish point contacts with a pair of stator contacts, assigned to that rotor, for selectively rendering he coils effective to achieve tuning to different television channels.

---

This invention relates to a novel step-by-step radio frequency (RF) tuning mechanism for selectively tuning a television receiver to different television signal channels. The invention is particularly attractive in constructing a very high frequency (VHF) tuner, and will be described in such an environment.

The cost of a television tuner may be lowered by, inter alia, developing a structure which requires fewer parts than prior tuners and/or which is susceptible to automatic mass production manufacturing techniques. As to the latter, the more automation employed in the manufacturing process the less handling and hand operations will be needed, with the favorable result that labor cost (and hence total cost) will be minimized. Of course, decreased manufacturing costs should not be obtained at the expense of sacrificing quality.

Applicant has devised a unique tuner construction that not only contains fewer and less expensive parts than most prior tuners, but also readily lends itself to automated manufacturing. As a consequence, the tuner obtains a substantial cost savings over most previous tuners, and over all tuners developed heretofore that are capable of achieving the same high level of performance as that accomplished by applicant's structure. Moreover, and of significant importance, applicant's economical tuner exhibits a degree of quality not attainable heretofore. Among other things, its ruggedness of construction, reliability, parts standardization and flexibility are unsurpassed in prior tuners.

A typical VHF tuner, whether of the turret or bandswitch variety, employs a rotatably mounted channel selector tuning shaft to which is rigidly affixed a rotor assembly containing tuning elements, such as inductance coils, and rotor contacts connected to the coils. In each angular position of the rotor assembly, different rotor contacts engage stator contacts of a stator assembly to functionally include a different selected coil in the circuitry of the tuner to effect tuning to different television channels. Applicant's novel tuner, in accordance with one of its aspects, relates to the construction of such a rotor assembly and the manner in which it cooperates with its stator assembly.

The invention may be practiced when only a single rotor assembly is included in the tuner and when the tuner is either of the turret or bandswitch type or a hybrid or combination of the two. If desired, the tuner may comprise a plurality of such rotor assemblies coaxially arranged and mechanically intercoupled or ganged on the same channel selector shaft. Alternatively, the invention may be employed when the plurality of rotor assemblies are mechanically intercoupled in side-by-side relationship such that their axes of rotation are spaced apart and parallel, as will be the case in the embodiments to be described. This provides a relatively thin tuner, namely one with a small depth dimension.

It is, therefore, an object of the invention to provide a new and improved RF tuner for a television receiver.

It is another object to provide an RF tuner which realizes manufacturing economies not previously attainable.

A further object of the invention is to provide an RF tuner which enjoys an overall quality not realized heretofore.

It is still another object of the invention to provide an RF tuner the components of which readily lend themselves to automated manufacturing techniques.

A multi-position step-by-step RF tuner, constructed in accordance with one aspect of the invention, comprises a rotatably mounted rotor having first and second faces normal to its axis of rotation and including a plurality of cavities each having an opening on the first face. A plurality of rotor contacts are mounted on the rotor around its periphery, and each of these contacts presents a substantially flat contact surface parallel to the rotor's axis. There are a plurality of inductance coils, each having two terminal leads, disposed in respective assigned ones of the cavities. Each coil has both of its leads extending through the opening, on the first face, of its associated cavity and these leads are electrically connected to different assigned ones of the rotor contacts. Means are provided for effecting step-by-step rotation of the rotor from one to another of a plurality of different angular positions. There is a stator assembly which includes a pair of stator contacts for engaging the contact surfaces of a different pair of rotor contacts in each angular position of the rotor to selectively render the coils effective to achieve tuning of a television receiver to different ones of a plurality of television channels.

The features of this invention which are believed to be new are set forth with particularity in the appended claim. The invention, together with further objects and advantages thereof, may best be understood, however, by reference to the following description in conjunction with the accompanying drawings, in the several figures of which like reference numerals identify like elements, and in which:

FIG. 2 is a front perspective view of the VHF/UHF tuning system of FIG. 1;

FIG. 3 is a perspective view, partially broken away and exploded, of the VHF tuner of FIG. 2 and shows, among other things, the tuner's three rotor assemblies;

FIG. 4 is a sectional view of the VHF tuner taken along section line 4—4 in FIG. 2;

FIG. 5 is a fragmentary sectional view taken along section line 5—5 in FIG. 4;

FIG. 6 is a fragmentary sectional view taken along section line 6—6 in FIG. 4;

FIG. 7 is a perspective, exploded view of a portion of the VHF tuner and specifically illustrates one of the rotor assemblies;

FIG. 8 is a fragmentary sectional view taken along section line 8—8 in FIG. 7;

FIG. 9 is a fragmentary perspective view, partially exploded, of a portion of the VHF tuner rotor assembly shown in FIG. 7 and depicts the manner in which contacts are mounted around the periphery of each of the rotor assemblies;

FIG. 10 is a developed view of one of the parts of the VHF tuner and specifically shows the developed configuration of each of the contacts carried by the rotor assemblies;

FIG. 11 is a fragmentary rear view partially broken away and in section taken along line 11—11 in FIG. 4;

FIG. 12 is a sectional view taken along section line 12—12 of FIG. 2;

FIG. 13 illustrates in detail a portion of the VHF tuner and is a fragmentary sectional view taken along section line 13—13 in FIG. 12;

Figure 1:
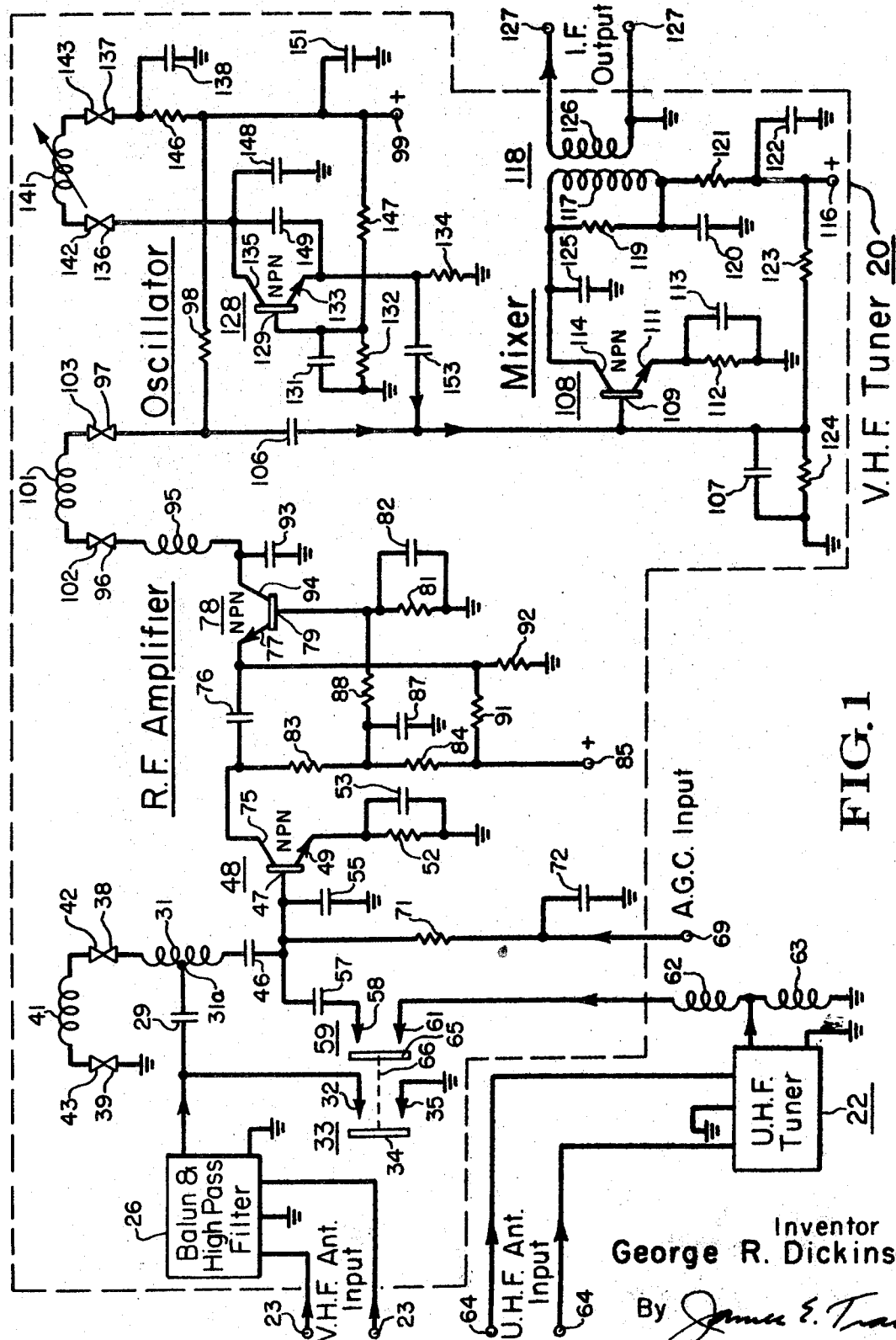
FIG. 1 is a schematic representation of a VHF/UHF tuning system for a television receiver and includes a VHF tuner having three rotor assemblies and constructed in accordance with one embodiment of the invention.

Initially, attention is directed to the schematic diagram of FIG. 1 which illustrates in detail the circuit of a step-by-step VHF tuner, identified by the reference numeral 20, embodying the invention. In addition, FIG. 1 shows in block form a conventional continuous tuning type UHF (ultra high frequency) tuner 22 and the manner in which it connects to the VHF tuner. The disclosed VHF/UHF tuning system is capable of selectively tuning the television receiver, in which the tuning system is included, to any channel within the VHF and UHF frequency bands.

Briefly, tuner 20 is of the superheterodyne type having a tunable RF amplifier, a variable frequency local oscillator, and a mixer whose output circuit is frequency-selective. The tuner facilitates the selection of the composite television signal, conveyed in a particular broadcast channel, from the television signals of the several other channels that are usually available in a given location. Conditioning of tuner 20 to select a particular desired television channel requires the adjustment or tuning of three different tuned circuits, two of which are included in the input and output respectively of the radio frequency amplifier stage, while the third tuned circuit forms part of the local oscillator and determines its operating frequency.

Under the television transmission standards existing in the United States, a composite television signal includes two different RF carriers separated in the frequency spectrum by 4.5 megahertz. The lower frequency carrier is amplitude modulated by the picture or video information while the higher frequency RF carrier is frequency modulated by the sound or audio information. To properly adjust tuner 20 to receive a given channel, the tuned input and output circuits of the RF amplifier are both tuned to resonate at a frequency approximately midway between the two RF carriers of that channel, whereas the oscillator tuned circuit is adjusted to resonate at a frequency higher than each of the RF carriers by a fixed amount as determined by the frequencies of the two intermediate frequency (IF) carriers to be produced. In accordance with the superheterodyne technique, the two received RF carriers of the desired television channel are beat or heterodyned with the local oscillator signal to produce in the output circuit of the mixer, which provides the output of the tuner, an intermediate frequency signal which includes, and is a combination of, an amplitude modulated picture IF carrier and a frequency modulated sound IF carrier having a fixed frequency separation of 4.5 megahertz from one another. The precise frequencies of the two IF carriers are determined by the operating frequency of the heterodyne oscillator, which may be varied by adjustment of the fine tuning control of tuner 20. It is contemplated that when that control is appropriately manipulated to achieve optimum tuning under normal or strong signal conditions, the local oscillator will be operating at a frequency that will establish the sound IF carrier at 41.25 megahertz and the picture IF carrier at 45.75 megahertz. This is consistent with present industry practice.

Considering now the FIG. 1 circuit diagram in more detail, RF tuner 20 has a pair of input terminals 23 to which a VHF receiving antenna may be connected via a balanced transmission line. Terminals 23 in turn connect to a network 26 which comprises, in the order named, a balun and a high pass filter. The balun essentially consists of an impedance matching transformer, the primary winding of which has a grounded center tap, for matching the balanced transmission line to the unbalanced input circuit of the RF amplifier. The filter of network 26 rejects all frequencies below 50 megahertz in order to remove any signals that could otherwise introduce interference in the IF signal.

The lower output terminal of network 26 is grounded while its upper output terminal is coupled via a capacitor 29 to the tap 31a of an inductance coil 31 and by a direct connection to a fixed contact 32 of a switch 33, a companion fixed contact 35 of which is grounded. The movable contact 34 of the switch is actuable from its reference or open position, shown in FIG. 1, to the right to mate with and establish an electrical connection between stationary contacts 32 and 35. The specific construction of switch 33 will be described later in connection with the mechanical description of tuner 20. Suffice it to say at this juncture that switch 33 is actuated under control of the VHF channel selector. Tuner 20 has thirteen discrete positions, twelve of which are needed to tune to the twelve channels in the VHF band while the thirteenth position is required to convert the tuner for UHF operation. In the twelve VHF channel positions, contact 34 is positioned as shown in FIG. 1, but in the UHF position contact 34 is moved into engagement with contacts 32 and 35.

The upper terminal of tapped coil 31 is connected to a fixed or stationary contact 38, a companion stationary contact 39 being grounded. A tuning element, in the form of an inductance coil 41, has its terminal leads respectively connected to a pair of contacts 42, 43 which engage and electrically connect to contacts 38, 39 respectively. Actually, tuner 20 has twelve different coils 41, each having a different inductance value, in order to effect tuning to the twelve VHF channels. In any one VHF channel position, only a single coil 41 is functionally incorporated into the tuner circuitry. As will be appreciated later, the twelve independent coils 41 are contained in a rotatable turret or rotor assembly which is step-by-step actuated, by manipulation of the VHF channel selector control, through a sequence of thirteen different angular positions as the tuner is stepped through its thirteen tuner positions. Contacts 42 and 43 thus constitute rotor contacts and contacts 38 and 39 provide stator contacts and are included in a stator assembly to be described. In each of twelve of the angular positions of the rotor assembly, a different pair of rotor contacts 42, 43 move into engagement with stator contacts 38, 39 to establish point contacts herewith and operatively connect a different coil 41 into tuner 20 in order to achieve tuning to a respective one of the twelve VHF channels. In the thirteenth angular position, in which the rotor assembly is established when the tuner is actuated to its UHF position, no coil is connected to contacts 38, 39; hence, those contacts are open during UHF operation.

The lower terminal of coil 31 is coupled through a capacitor 46 to the base 47 of a transistor 48 of the bipolar type and NPN gender, and which is one of two transistors included in the RF amplifier. The emitter 49 of transistor 48 is connected to ground through a resistor 52 shunted by a capacitor 53. A capacitor 55 couples base 47 to ground, while a capacitor 57 couples the fixed contact 58 of a switch 59 to the base. A pair of series-connected coils 62, 63 are coupled between a fixed contace 61 of switch 59 and ground. UHF tuner 22 is provided with a pair of input terminals 64 to which a UHF antenna may be coupled. The output of tuner 22 is coupled to the junction of coils 62 and 63. The movable contact 65 of switch 59 is ganged to and actuates concurrently with contact 34, as illustrated by dashed construction line 66. In each of the twelve VHF channel positions contact 65 is therefore positioned as shown in FIG. 1 and contacts 58 and 61 remain open, while in the UHF position contact 65 engages and interconnects contacts 58 and 61, thereby coupling the output of UHF tuner 22 to the input of transistor 48.

Tuner 20 is provided with an AGC (automatic gain control) input terminal 69 to which an AGC voltage source (not shown) is to be connected. An isolation resistor 71 connects terminal 69 to base 47, and a bypass capacitor 72 couples the terminal to ground to avoid oscillator radiation and to prevent a received television signal from reaching the AGC source or any part of the television receiver other than the VHF tuner itself; in addition this arrangement prevents any signal voltages, induced in the external AGC lead, from reaching base 47. Transistor 48 is designed for forward gain control. In other words, the gain of the transistor is reduced by increasing its static emitter current. The AGC voltage source must, therefore, be constructed so that the gain control potential applied to terminal 69 is positive and of a magnitude directly proportional to the received signal strength; the greater the strength of a television signal selected by the tuner, the greater will be the positive AGC voltage applied to base 47. In this way, an increasing AGC potential (in a positive direction) increases the base-emitter bias of transistor 48 which in turn increases its static or quiescent emitter current.

The collector 75 of transistor 48 is coupled through a capacitor 76 to the emitter 77 of a bipolar transistor 78 of the NPN variety which has its base 79 connected to ground through a resistor 81 bypassed by a capacitor 82. Collector 75 is also coupled through series-connected resistors 83, 84 to the positive terminal 85 of a source of D.C. or unidirectional operating potential, the negative terminal of which is grounded. The junction of resistors 83 and 84 is bypassed to ground through a capacitor 87 and is also connected through a resistor 88 to base 79 of transistor 78. A voltage divider comprising a pair of series-connected resistors 91, 92 connects positive terminal 85 to ground, with the junction of the resistors being connected to emitter 77. A capacitor 93 couples the collector 94 of transistor 78 to ground and an inductance coil 95 couples that collector to a fixed contact 96 whose companion fixed contact 97 is connected through a resistor 98 to the positive terminal 99 of a source of unidirectional operating potential whose negative terminal is grounded. The various circuit components may be, and are preferably, arranged so that terminals 99 and 85 are one and the same.

A tuning element in the form of an inductance coil 101 has its two terminal leads respectively connected to a pair of contacts 102, 103 which mate with contacts 96, 97 respectively. Tuner 20 includes thirteen different coils 101 each of which exhibits a different inductance and is functionally included in the tuner in a different assigned one of the thirteen tuner positions. As will be seen, the coils 101 form part of a thirteen position rotatable rotor assembly or turret which is of similar construction to that which carries coils 41. Contacts 96, 97 therefore are stator contacts and contacts 102, 103 are rotor contacts. As tuner 20 is step-by-step actuated from one position to the next, a different pair of movable or rotor contacts 102, 103, and thus a different coil 101, step into engagement with fixed or stator contacts 96, 97. A coil 101 must also be connected across contacts 96 and 97 during UHF operation for reasons to be explained.

With the exception of the AGC action, transistors 48 and 78 and their associated circuitry collectively constitute a conventional transistorized cascode RF amplifier; the transistors are respectively connected in common emitter and common base configuration. With respect to A.C., the emitter-collector conduction paths of the two transistors are in series. Resistors 52, 83, 88, 84, 91, 92, 81, and 98, in conjunction with positive voltage sources 85 and 99, establish appropriate bias and operating potentials for the transistors.

Since collector 75 is D.C. connected (via resistors 83 and 88) to base 79, transistor 48 serves as a D.C. amplifier and phase inverter with respect to the AGC signal, with the result that there is applied to base 79, to effect gain control of transistor 78, an amplified AGC voltage which varies in a sense opposite to that of the AGC voltage variations applied to base 47. For example, a positive-going AGC voltage at base 47 (which occurs in response to an increase in received signal strength) produces a negative-going AGC voltage at base 79. Transistor 78 therefore must be designed for reverse gain control namely, its gain is reduced by decreasing its static emitter current. Employing reverse, rather than forward, AGC on transistor 78 is most helpful in stabilizing the output capacitance of the RF amplifier in the presence of gain or bias changes in order that the frequency response characteristic of the amplifier will exhibit the same shape for all signal strength conditions.

The tuned input circuit of the RF amplifier primarily comprises capacitors 29, 46 and 55, coil 31, and the particular coil 41 which is oepratively included in the tuner at the time, assuming that tuner 20 is positioned to one of its twelve VHF channel positions. The resonant circuit will be tuned to resonate at a frequency approximately midway between the two RF carriers of the selected VHF channel. Capacitors 46 and 55 also serve to impedance match the tuned circuit to transistor 48.

The tuned output circuit of the RF amplifier, which is tuned to the same frequency as the input circuit, essentially includes capacitor 93, coil 95, the particular coil 101 instantaneously in functional relationship, with a pair of series connected capacitors 106, 107 which couple contact 97 to ground. The tuned output circuit also functions as an interstage coupling network for impedance matching the output of the RF amplifier to the input of the mixer stage.

The mixer, which is of conventional construction, includes an NPN bipolar transistor 108; its base 109 is connected to the junction of capacitors 106 and 107, its emitter 111 is connected to ground through a resistor 112 shunted by a capacitor 113, and its collector 114 is coupled to the positive terminal 116 of a source of unidirectional or D.C. operating potential, whose negative terminal is grounded, through the series arrangement of the primary winding 117 of a transformer 118 and a resistor 121. A resistor 119 shunts primary 117. A capacitor 120 is coupled between the junction of elements 117, 119 and 121 and ground. Preferably, positive voltage source 16 is of the same magnitude as that found on terminals 85 and 99. Terminal 116 is bypassed to ground via a capacitor 122 and is also connected to ground through a voltage divider consisting of a pair of series-connected resistors 123, 124. The junction of the resistors is connected to base 109. A capacitor 125 couples collector 114 to ground. The secondary winding 126 of transformer 118 is coupled to a pair of output terminals 127 to provide the output IF signal of tuner 20. Preferably, terminals 127 take the form of a jack or socket in which the plug of a shielded cable may be inserted in order to connect the output of the tuner to the IF amplifying channel of the television receiver.

The output of the oscillator stage is also coupled to the input of the mixer. More specifically, the oscillator includes an NPN transistor 128 having its base 129 connected to ground through the parallel arrangement of a capacitor 131 and a resistor 132, its emitter 133 grounded through a resistor 134, and its collector 135 connected to a fixed contact 136 whose companion contact 137 is grounded through a capacitor 138. As in the case of coils 41 and 101, a tuning element in the form of an inductance coil 141 is shown in FIG. 1 with its two terminal leads respectively connected to a pair of movable rotor contacts 142, 143 which in turn respectively engage contacts 136, 137. In similar fashion as described hereinbefore in connection with coils 41 and 101, a different coil 141 is connected between stator contacts 136 and 137 in each of the twelve VHF positions of the tuner in order that the oscillator will oscillate at a different frequency for each of the VHF channels. The twelve coils 141 are contained within a third thirteen-position rotor assembly or turret which step-by-step rotates in unison with the other two turrets. No coil 141 connects to contacts 136 and 137 in the UHF position of tuner 20 since in that position the oscillator must be inoperable. The inductance of each coil 141 may be precisely adjusted to achieve preset fine tuning of each VHF channel. As will be shown, telescoped within and coaxial with each coil 141 is a threaded metal slug or core which is longitudinally adjustable to vary the inductance of the coil.

Stator contact 137 is connected through a resistor 146 to positive terminal 99, while base 129 connects to that terminal via a resistor 147. A capacitor 148 couples collector 135 to ground and another capacitor 149 couples that collector to emitter 133 to introduce feedback. An A.C. bypass capacitor 151 is coupled between positive voltage source 99 and ground. Resistors 132, 147, 134 and 146 establish suitable operating and bias potentials for transistor 128. The resonant circuit, which determines the oscillating frequency of the oscillator, essentially comprises capacitors 148 and 138 and the particular coil 141 connected to the oscillator at the time, assuming that tuner 20 is in one of its twelve VHF positions.

The operation of the oscillator is conventional and, assuming that the fine tuning control has been properly adjusted, there will be produced a heterodyning signal of a frequency equal to the resonant frequency of the tuned circuits of the RF amplifier plus the center frequency of the IF bandpass, namely the frequency that lies midway between the sound IF carrier and the picture IF carrier.

The oscillating signal is supplied to the mixer by means of a capacitor 153 that couples emitter 133 to base 109. The mixer functions in conventional manner and beats or heterodynes that signal with the picture and sound RF carriers of the selected channel to produce in the output of the mixer the customary sum and difference modulation components. Transformer 118 and capacitors 120 and 125 form a resonant output circuit tuned to the middle of the IF bandpass so that the RF carriers will be converted to their IF counterparts and delivered to the IF output terminals 127 of tuner 20.

To fully appreciate the frequency relationships of the various signals present in tuner 20, its operation will be considered in response to a composite television signal conveyed in, for example, VHF Channel 2. Accordingly, under U.S. standards, the picture RF carrier of the composite signal will have a frequency of 55.25 megahertz and the sound RF carrier will be established at 59.75 megahertz. Assuming that tuner 20 is rotated to its Channel 2 position, the particular coils 41 and 101 selected for incorporation into the tuned input and output circuits of the RF amplifier will each have an appropriate inductance value to effect tuning of those circuits to approximately 57.5 megahertz, which is the half way frequency between the two RF carriers. Of course, the tuned circuits of the RF amplifier must be sufficiently broadly tuned to accept the RF carrier frequencies. Since the sound and picture IF carriers are to fall at 41.25 and 45.75 megahertz respectively, the particular coil 141 selected for the oscillator will be appropriately valued to cause the oscillator to oscillate at a frequency greater than that to which the RF amplifier is tuned by the amount of the center frequency (i.e. 43.5 megahertz) of the IF bandpass. As a consequence, for Channel 2 reception the oscillator will oscillate at 57.5+43.5 or 101 megahertz. Beating of the 55.25 and 59.75 megahertz RF carriers with the 101 megahertz oscillator signal results in the production, in the frequency-selective output of the mixer, of an IF signal containing a sound IF carrier at 41.25 megahertz and a picture IF carrier at 45.75 megahertz. Again, the tuned output circuit of the mixer must be appropriately broadly tuned so that both of the IF carriers are delivered to IF output terminals 127.

During UHF reception, tuner 20 must be actuated to its UHF position at which time movable contacts 34 and 65 electrically connect their associated pairs of fixed contacts, and in addition contact pairs 38, 39 and 136, 137 become open. The output of network 26 is thus grounded through contacts 32, 34 and 35 to prevent any VHF television signals from reaching the input of the RF amplifier; and a coupling circuit is completed, through contacts 58, 61 and 65, from the output of UHF tuner 22 to the input of the RF amplifier. In conventional fashion, tuner 22 may be continuously tuned to select the desired UHF channel. By means of appropriate heterodyning circuitry in tuner 22 the two RF carriers of the selected channel are converted to IF carriers having the identical frequencies as that produced in the output of the mixer of tuner 20 in response to a received VHF channel. Coils 62 and 63 in conjunction with capacitors 29, 46, 57 and 55 constitute a resonant circuit tuned to the frequency midway between the two IF carriers produced in the output of tuner 22; hence, it will be designed to resonate at 43.5 megahertz.

The coil 101 connected across stator contacts 96 and 97, during UHF operation, will be suitably valued so that the output circuit of the RF amplifier will resonate at 43.5 megahertz. As a consequence, the RF amplifier serves as an IF amplifier for the output signal of the UHF tuner. With an open circuit between stator contacts 136 and 137 the oscillator is made inoperative so only the amplified IF signal is applied to the input of the mixer which, like the RF amplifier, now functions as an IF amplifier. Thus, a received UHF television signal manifests at output terminals 127 as an IF signal having the very same makeup as an IF signal produced from a received VHF television signal.

Consideration will now be given to a discussion of the mechanical details of the tuning system as illustrated in the embodiment of FIGS. 2–13. As is best indicated in FIGS. 2 and 3, the movable portions of tuner 20 are contained within a shield housing 160 which is a closed six-sided box type structure formed of conductive metal; it serves as a support for the various elements of the tuner and also as a shield to protect against unwanted radiation. As viewed in FIG. 2, the front wall or side 160a of box 160, the top side 160b, the right end wall 160c and the left side 160d (shown in FIG. 3) are all formed from a single flat metallic sheet. The rear wall 160e of housing 160 is removably affixed to end walls 160c and 160d by means of a series of screws 161. The bottom side 160f takes the form of an inverted U-shaped channel removably affixed, such as by screws (not shown), to end walls 160c and 160d. With the exception of the end walls, each of the sides of the housing provides support for various elements of the tuner. Hence, they may be appropriately characterized as support members or plates.

The space between the two depending partitions of bottom support 160f is sufficient to house and accommodate all of the elements of tuner 20, such as capacitors, resistors, transistors, coils, etc., not contained within box 160. Although not specifically shown in the drawings, the input and output terminals of the tuner may be mounted on the depending partitions of bottom member 160f.

The three individual turrets or rotor assemblies for carrying the three groups of coils 41, 101 and 141 and their associated rotor contacts are repsectively denoted by the reference numbers 164, 166 and 168. The turrets are rotatably mounted in side-by-side relationship with their axes of rotation spaced apart and parallel. Each turret may be actuated to thirteen equally spaced angular positions corresponding to the thirteen tuner positions. In many respects the three rotor assemblies are similarly constructed. Basically, each includes a rotor (identified by the reference numerals 170, 171 and 172) around the periphery of which are affixed its associated movable or rotor contacts. Each rotor is formed of plastic insulating material and has cylindrically shaped hub end portions to permit journaling thereof in support members 160a and 160e. Preferably, each rotor 170, 171, 172 is made of a suitable thermoplastic material. In this connection many of the mechanical parts to be described may be formed of plastic and in each instance a thermoplastic is to be preferred.

Since the three rotor assemblies 164, 166 and 168 have many obvious common structural features, a detailed mechanical description of only one of them will be presented, the descriptions of the other two rotor assemblies being confined to their individual unique features. Considering in detail turret 164, by way of example, its rotor 170 is shaped to have two surfaces or faces 170a, 170b (see FIG. 12) normal to its axis of rotation. The rotor also has an open-center hub 170c for rotatably mounting rotor assembly 164 within housing 160. More particularly, the cylindrically shaped right end portion of hub 170c (as viewed in FIG. 12) projects from face 170a and is journaled in an aperture 173 of support member 160e for free rotation. In addition, the cylindrically shaped left end portion of hub 170c extends from face 170b and is journaled in an aperture 174 of support wall 160a. Bowed washer 176 urges turret 164 toward front wall 160a to hold the turret against axial movement and to insure proper alignment between movable contacts 42, 43 and stationary contacts 38, 39.

In accordance with the present invention, rotor 170 has formed therein a series of thirteen circumferentially arranged cavities 170d which specifically constitute wells each extending in the direction of the axis of rotation of rotor 170 and having an opening on face 170a. The twelve coils 41 are disposed and held in respective assigned ones of twelve of the thirteen cavities 170d, as best seen in FIGS. 12, 11 and 9, the last two figures of which illustrate the details of turret 168. Because of the constructural similarities of the turrets, however, FIGS. 9 and 11 also depict the manner in which coils 41 are arranged. With coils 41 effectively buried in rotor 170, complete protection is obtained against accidental damage to the coils that may otherwise occur during the assembling of the tuner. The thirteenth cavity or compartment 170d, which contains no coil, is shown in dashed construction in the upper half of FIG. 12.

The peripheral portion of the rotor which is adjacent wells 170d is notched, with a small amount of undercutting, to provide a series of 26 flat-topped lobes or lugs (2 per well) to facilitate dovetailed mounting of the rotor contacts 42, 43. All three rotors 170, 171, 172 are similarly notched and all of the movable contacts 42, 43, 102, 103, 142, 143 are of identical construction. Hence, FIGS. 9 and 10 also disclose the detailed shape of contacts 42 and 43 and the manner in which they are affixed to rotor 170. The shape of the 26 lobes of each rotor is best seen in FIGS. 9 and 11 which illustrate in detail the lobes (designated by reference numeral 172e) of rotor 172. FIG. 10 shows the developed configuration of each rotor contact, namely its configuration before forming or bending into its finished shape as shown in FIG. 9. The shading in FIG. 10 indicates the portion of the contact that is preferably provided with a gold inlay to avoid any possible corrosion or contamination of the contacts and hence to enhance the reliability and maximize the life of the tuner.

As seen in FIG. 9, a major portion of the formed rotor contact is of inverted U shaped to provide a pair of depending, and slightly converging, legs that dovetail into and grip the undercut notches in order to hold the contact on the periphery of the rotor. The small tab of each rotor contact, designated by the reference number 143a in FIG. 9, serves to properly position or align the contact when it is driven onto its associated supporting lobe. Of course, it is contemplated that assembling of the rotor contacts on each rotor will be performed by automated, high speed production equipment. Each contact is driven until its tab abuts or engages a ring or shoulder portion of the rotor. As shown in FIG. 12, shoulder 170e presents a stop for rotor contacts 42, 43.

Each of the twelve coils 41 has both of its terminal leads extending through the opening, on face 170a, of the cavity 170d in which the coil is contained. Each of contacts 42, 43 has a projecting portion (designated 143b in FIG. 9) which extends out from and beyond face 170a, namely to the right as viewed in FIG. 12. This facilitates convenient soldering of the terminal leads to the associated rotor contacts and constitutes a salient feature of the invention. Overhanging of all the rotor contacts to the same side of rotor 170 and electrically connecting the terminal leads of the coils 41 to the overhanging portions, permits the employment of dip soldering techniques for simultaneously soldering all twenty-four connections. Moreover, this can be achieved with automated manufacturing apparatus, and represents a significant cost savings over all prior types of tuner construction.

Of course, it is preferred that the wire conductor, of which each coil is made, is sufficiently stiff so that the coils are self-supporting once their terminal leads are affixed to their associated contacts.

Each of the contacts on rotor 170 thus presents a flat gold inlay contacts surface parallel to the rotor's axis. A sheet or lamination 181 of plastic insulating material is secured to bottom support 160f to insulate the stator contacts of the tuner from housing 160. Stator contacts 38, 39, which in each of the twelve VHF positions of turret 164 engage the contact surfaces of a different pair of rotor contacts 42, 43, are mounted in cantilever fashion to insulating board 181, an end portion of each stator contact being free and presenting a contact area for engaging the flat rotor contacts and establishing a point contact therewith. All of the stator contacts are of identical construction. Thus, FIG. 11 which shows the details of fixed contacts 136 and 137 also illustrate the construction of contacts 38 and 39. Bottom support 160f and all of the fixed elements mounted thereto both within and without housing 160 may collectively be characterized as a stator assembly.

The stator contacts are uniquely constructed in accordance with another feature of the invention; they therefore warrant more detailed consideration. Since the stator contacts are identical, contact 137 will be described, by way of example, since it is shown in each of FIGS. 3, 4, and 11. Stator contact 137 comprises a resilient metallic strip with its contact area 137a being spherical shaped and preferably provided with a gold inlay. The cantilever mounted section is compressed by rotor assembly 168. Hence, stator contact 137 is deflected and stressed such that its contact area 137a is urged toward the engaged rotor contact. As best seen in the side view of FIG. 11, contact 137 is formed so that most of the metallic strip is folded over or doubled back on itself. An eyelet 182 extends through apertures in the folded over portions and through an aperture in insulator sheet 181 to anchor 137 in position. A depending tab portion 137b of the contact extends through an aperture 184 in board 181 and through a larger aperture in bottom support 160f to provide a terminal to which the wire conductor (connecting contact 137 with resistor 146 and capacitor 138) may be soldered.

Doubling contact 137 back on itself minimizes the path length and the inductance presented by the contact. The flux produced by current flowing between contact area 137a and eyelet 182 will be substantially cancelled by the flux developed from the current flowing between the eyelet and terminal 137b. Hence, any inductance in the stator contact will have a negligible effect on the tuning of the tuner.

The mounting arrangement also facilitates accurate positioning or alignment of the stator contact and lends itself to high speed automated production. In initially forming the contact, the folded over portions are apertured at the precise location where eyelet 182 is to be inserted. To secure the contact, its apertures are registered with the corresponding hole in board 181 and tab portion 137b is inserted in hole 184. Eyelet 182 is then inserted and flared. Of course, the holes in board 181 for eyelet 182 and tab 137b are appropriately located and dimensioned so that when the contact is anchored in place contact area 137a will be properly positioned.

Aperture 184 and its counterpart aperture 185 for stator contact 136 are both of the same size but are purposely misaligned or offset. Specifically, the distance between hole 185 and housing wall 160e is slightly greater than that between hole 184 and wall 160e. The effect of this misalignment is to stagger the spherical contact areas of contacts 136 and 137 in order that those areas engage different portions of rotor contacts 142, 143, with the result that contact wear is minimized. Consequently the gold thickness of the rotor contacts may be minimized.

The point contact established between spherical area 137a and the particular rotor contact with which it is engaged has many advantages over a knife type contact arrangement, namely wherein a movable blade contact slides or knifes inbetween a pair of resilient converging jaw contacts. As one advantage, precise indexing or detenting is not required in applicant's tuner construction since each of the spherical contact areas may engage a rotor contact at any point on its flat contact surface and a good electrical connection will still be made and minimum inductance introduced. In contrast, a knife blade contact must slide between opposed jaw contacts at the exact point where they converge or meet. Otherwise, the blade is likely to engage only one of the jaw contacts, a gap developing between the blade and the other jaw contact. As a result, a substantial amount of inductance is added and this will cause noticeable detuning of the tuner. To elucidate, each of the fixed jaw contacts has a certain amount of inductance and this will be included in the tuned circuit controlled by the movable knife blade contact. At the relatively high frequencies of the television signals the inductances of the two jaw contacts have a significant bearing on the operation of the tuner since the resonant frequency of the tuned circuit is determined in part by those inductances. When the knife blade contact properly engages both of the jaw contacts, the two inductances of the jaw contacts are in parallel thus presenting or adding to the tuned circuit a net contact inductance approximately one-half of that of each of the jaw contacts alone. When the blade contact fails to mate with one of the jaw contacts, the contact inductance included in the tuned circuit will consequently be doubled and this, of course, causes the tuned circuit to resonate at a frequency substantially different than its resonant frequency when the blade contact engages both of the jaw contacts.

As another advantage, the employment of gold inlays on the contact areas to insure against contamination or corrosion cannot economically be done in the knife type arrangement inasmuch as four different surfaces (the two sides of the blade contact and both jaw contacts) must be gold inlayed to establish a single connection. In the present case, only two surfaces need be gold inlayed.

The deflected or cantilever mounted section of contact 137, namely that between area 137a and eyelet 182, is uniquely shaped in accordance with the invention to exhibit very desirable characteristics. It is formed to constitute a uniformly loaded beam. This is achieved by tapering out or widening the contact from its free end or contact area 137a toward the point where it is fixed, namely eyelet 182. The cantilever mounted section is always in a state of deflection, and thus under stress, and contact area 137a exerts a constant force against the periphery of rotor 172. As the rotor is rotated, the amount of deflection and stress vary slightly. With the uniformly loaded beam construction, any force at area 137a produces uniform stress loading between that area and eyelet 182. In other words, equal stress will be experienced at every point along the deflected section of contact 137. Uniform loading of the stator contact minimizes metal fatigue and consequently prolongs the life of the contact.

Metal fatigue is also lessened by minimizing the extent of deflection of contact 137 as rotor 172 is rotated. This is accomplished by minimizing the space between adjacent rotor contacts and employing a relatively large diameter for the spherical shaped contact area 137a. Such dimensioning of the rotor and stator contacts also achieves another desirable result. In actuating rotor 172 from one position to the next, stator contact 137 at all times engages at least one rotor contact and during a portion of the transitional time interval bridges two successive rotor contacts. At least one of the inductance coils carried by rotor 172 will thus always be functionally included in the tuner, as a consequence of which minimum circuit disruption and picture flashing occurs as the tuner is manipulated.

Even though the spherical contact area is made sufficiently large to minimize deflection and achieve bridging of adjacent rotor contacts during channel changing, the mass of area 137a is still made sufficiently small so that the stator contact, with its uniformly loaded beam construction, is not susceptible to tuner vibration. In this way, if the entire tuner is vibrated, the rotor and stator contacts will remain in engagement and not separate.

The three rotor assemblies 164, 166 and 168 are mechanically intercoupled such that step-by-step rotation of any one rotor assembly effects simultaneous rotation of the other two. This is achieved by a gearing arrangement comprising three gears each of which forms part of a respective one of the three turrets. The three gears are similarly shaped to achieve a one-to-one gear ratio from one gear to the next. More specifically, each of rotors 170 and 171 has formed therein a peripheral ring (170f and 171f respectively) with gear teeth. Turret 168 differs from turrets 164 and 166 in that it includes a separate plastic gear disc 183 (best shown in FIG. 7) which is keyed to rotor 172. The three turrets are aligned such that their three axes of rotation lie in the same plane and the geared peripheral ring 171f of turret 166 meshes with both gears 170f and 183.

With this arrangement, the VHF channel selection tuning shaft may be telescopically received by and mechanically coupled to any one of the turrets to effect rotation of all three from one to another of the thirteen tuner positions. Such advantageous flexibility is realized by employing open-center hubs for rotors 170, 171 and 172 and journaling the end portions of those hubs in apertures of support members 160a and 160e. This permits the insertion of the VHF tuning shaft through any one of the apertures and into the hub journaled in that aperture. The VHF channel selector shaft may thus drive tuner 20 at any one of six different locations; it may mechanically connect to either one of the three rotors and from either side thereof. This is facilitated by shaping the bore of the open-center hub of each rotor to have a noncircular cross-section therefore to provide a corresponding noncircular opening. One end of the tuning shaft is given a similar cross-section in order that the shaft may be seated in and keyed to anyone of the rotors. Specifically, each of the rotors is given an octagonal or eight-sided cross-sectional configuration, as best seen in FIG. 11.

In the embodiment illustrated, the channel selection or main tuning shaft, denoted by the numeral 186, is seated in the bore of rotor 172 and is captivated by means of a screw 187 and a washer 188, as seen in FIGS. 4 and 11. Thus, rotation of shaft 186 initially rotates turret 168 which in turn drives turrets 166 and 164. Shaft 186, screw 187 and washer 188 are also shown in dashed construction in FIG. 3, and are identified by corresponding but primed reference numbers, to indicate that the shaft may be directly connected to rotor 171 to change tuner positions by initially turning turret 166. Of course, the particular location of the VHF tuning shaft depends on the design, configuration, dimensions, etc. of other components of the television receiver, particularly the cabinet and escutcheon thereof.

Tuning shaft 186 has a flat on its free end to receive and index a channel selector control knob so that tuner 20 may be manually adjusted. If desired, other than manually operated driving means may be employed. For example, a motor operated driver may be coupled to tuning shaft 186. This is particularly desirable if tuner 20 is to be remotely controlled.

As to remote control operation, another advantage of tuner 20 is that the remotely actuated tuner drive mechanism may be programmed from in front of the television receiver. To explain, in prior remotely controlled VHF tuners an indexing disc, affixed to the channel selector shaft usually behind the tuner, supports a series of two-position indexing elements each of which is assigned to a respective one of the VHF channels. The elements are accessible from the back of the receiver so that those associated with the active channels, in the geographical area in which the receiver is located, may be adjusted to one position while the other elements may be set in the other position. In response to remote actuation of the tuner drive mechanism, sensing apparatus senses the indexing elements to effect stopping of the tuner at the next active channel, any inactive channels inbetween being skipped. Front mounting of the indexing disc is precluded, in these prior costructions, by the presence of interfering mechanical parts, such as the fine tuning mechanism. In tuner 20, however, the indexing disc may be secured to any one of the three turrets, as a consequence of which it may be located in front of the tuner and accessible from the front of the receiver. For example, the disc may be affixed to rotor 171 of turret 166 in front of front wall 160a without interfering or conflicting with the other parts of the tuner.

An important advantage of employing open-center hubs rotatably mounted in apertures of housing 160 is that the tuner may be manufactured complete with all its parts except the main tuning shaft. This is particularly true when shaft 186 connects directly to rotor 171, as shown in dashed construction in FIG. 3. Universality, and resultant cost saving, are achieved since the tuning shaft itself, which may take a variety of different lengths depending on the environment of the tuner, may then be added later. When shaft 186 is to be received by and keyed to the hub of rotor 172, as shown in full line construction in FIG. 3, the shaft will initially be pre-assembled to the fine tuning control apparatus (to be described later) mounted on and surrounding shaft 186 and located outside of front wall 160a. The sub-assembly may then be added to complete the tuner construction.

With tuning shaft 186 directly connected to rotor 172, the bores through the hubs of rotors 170 and 171 remain open to provide two access openings through the tuner to permit control of other circuitry included in the television receiver. Preferably, the transverse dimension of each bore is made sufficiently large to accommodate a control shaft for adjusting some operating characteristic of the receiver. For example, and as shown in FIG. 2, the bore of rotor 170 is large enough to accommodate the control shaft 189 of UHF tuner 22, both of which are shown in dashed construction. It is to be noted that an eight-sided cross-section was selected for the bore of each hub, rather than six or some other number less than eight, in order that an access opening of maximum size is obtained while still permitting keying or locking of the VHF tuning shaft to any rotor.

Actually, it is not necessary to insert a channel selector shaft into the hub of one of the rotors to achieve tuner actuation. If desired, rotation of the turrets may be facilitated by other means. It is not essential that a channel selector shaft be coaxial or concentric with any of the hubs. For example, one of the journaled end portions of one of the hubs may be geared and extended sufficiently beyond the housing wall to permit coupling to another gear which in turn may be manually or motor driven. As another example, a channel selector shaft may be extended through the tuner housing at any convenient location and may be gear coupled to the geared peripheral portion of any one of the turrets. All of the open-center hubs would then be available for other uses.

Unlike the other two turrets, turret 164 contains a plastic collar or cam element 192 encompassing and secured to, by means of a set screw 193 (see FIG. 12), to the left end of hub 170c. Cam 192 has a pointed ridge portion 192a which, when tuner 20 is in its UHF position, pushes or cams downward a plastic bar 194. Each of movable contacts 34 and 65 has a central portion that is riveted to insulating sheet 181 by a pair of rivets 195, one of which is shown in detail in FIG. 12, while its two free ends are riveted to plastic bar 194 by a pair of rivets 196, one being shown in detail in FIG. 12. In the UHF position, cam 192 pushes the two free ends of contact 34 into engagement with fixed contacts 32 and 35, while the two free ends of contact 65 mate with contacts 58 and 61, as shown in FIG. 13.

Aside from an absence of a cam on rotor 171, rotor assembly 166 is substantially identical to rotor assembly 164 with the further exception that each of the thirteen wells formed in rotor 171 contains a coil 101. Full occupancy of the coil cavities is necessary since in the UHF position of tuner 20 a coil 101 must be connected across stator contacts 96 and 97 so that the output of the RF amplifier is tuned to the IF signal and is coupled to the input of the mixer stage.

Turret 168, as to its wells, coils 141 and rotor contacts 142, 143, is similar to the other two turrets. This is apparent in FIGS. 4 and 11. Like turret 164, only twelve of the thirteen cavities in rotor 172 contain a coil 141 inasmuch as no coil is to be connected to stator contacts 136 and 137 during UHF operation. Unlike the other two rotors, rotor 172 has a peripheral portion (designated 172a) thereof scalloped to provide a series of thirteen indentations which cooperate with the detent roller 198a of a detent mechanism 198 to afford positive indexing and step-by-step actuation of the turret assembly. Because of the mechanical intercoupling of all three rotor assemblies, detenting of only one of them achieves detenting of all.

Since rotor assembly 168 controls the adjustment of the local oscillator, the preset fine tuning mechanism is associated with that turret. The oscillator for any VHF channel may be fine tuned and preset without disturbing the tuning of any other channel. More particularly, plastic gear disc 183 encompasses the hub of rotor 172 and is fixed in position and properly oriented relative to the rotor by means of a stub or key 172b which is inserted into a cooperating key way aperture 183a, see especially FIGS. 7 and 8. Disc 183 contains a series of six circumferentially disposed cutouts 183b in each of which a pair of fingers or fins 183c, formed out of disc 183, extend. The cutouts or apertures 183b are so shaped and the fins 183c so positioned that a series of twelve guides are provided each of which is coaxial or aligned with a respective assigned one of the twelve oscillator coils 141. A tuning slug in the form of an aluminum screw 201 is held by a fin 183c in each of the guides and is telescopically received by the assigned coil 141 to facilitate adjustment of the coil's inductance. Note, in FIG. 4, that the wells for holding the coils terminate in apertures through which screws 201 extend into the cores of coils 141.

The heads of screws 201 are punched to constitute small gears so that each screw may be rotated and longitudinally moved and located along the axis of its associated coil to obtain precise fine tuning. With disc 183 made of a suitable plastic material, such as Delrin, and with fins 183c properly dimensioned to exhibit an appropriate resilience, tuning screws or slugs 201 will be gripped and held by disc 183 but they may be axially displaced by turning the geared screw heads. No internal threading of the guides is necessary. In assembling the tuner, screws 201 may be pressed or pushed into their guides. Once in, they will be firmly retained, but are readily adjustable and after setting will be retained by disc 183 against displacement. When any screw 201 reaches either end of its stroke (namely either all the way in or all the way out of the coil's core), the screw slips in response to continued rotation.

A plastic sleeve or collar 204 is telescoped on the hub of rotor 172 and serves to properly space a plastic kickout cam 206 which also fits over the rotor's hub. Cam 206 has four keys 206a respectively received in four keyways 172c formed in the hub to lock and appropriately orient the cam to the rotor. A bowed washer 207 (see FIGS. 3 and 4) urges turret 168 toward front support wall 160a and prevents axial movement of the turret.

A plastic carriage 209 is slidably mounted between and captivated by cam 206 and wall 160a. The carriage is molded to have a stub or pin 209a integral therewith which extends through and is slidably received by a guide slot 211 cut out of wall 160a. The slot, in cooperation with another slot to be described, guides and restricts the movement of carriage 209 to the vertical direction, as viewed in FIGS. 4, 5 and 6. A shaft 213, rotatably mounted in carriage 209, has a pair of pinions 214 and 215 secured to its terminal ends. The pinions and shaft are also preferably formed of plastic and are captivated to carriage 209 by staking or heat sealing. The portion of the carriage which accommodates shaft 213 extends into another guide slot 217 cut out of support 160a. It is slot 217 that cooperates with slot 211 to limit carriage 209 to vertical movement only. Pinion 214 is located inside of housing 160 and is dimensioned so that its gear teeth will be effective to engage and mesh with the geared head of a screw 201 regardless of the particular axial position of the screw. Pinion 215 is located outside of the housing.

The particular coil 141 to be effective, namely the coil selected for incorporation into the resonant circuit of the oscillator, in that which is directly above and connected to fixed contacts 136 and 137, as seen in FIG. 11. Pinion 214 is positioned so that it is normally disengaged from, but directly below (as viewed in FIG. 4), the geared head of the tuning screw 201 for that selected coil. Pinion 214 is normally prevented from engaging the tuning screw by the effect of a wire spring 219 which biases or urges stub 209a and consequently carriage 209 downward.

Upward movement of the carriage and adjustment of the inductance of the effective oscillator coil is achieved by the structure best seen in FIGS. 3, 4 and 5. A metallic fine tuning hollow shaft 221 telescopes over, but is independently rotatable with respect to, channel selection tuning shaft 186. A flat is provided at the free end of shaft 221 to permit the attachment of a control knob. Concentric channel selector and fine tuning control knobs may thus be employed. A plastic gear 222 is affixed, such as by staking, to the other end of shaft 221. Gear 222 lies in the same plane as pinion 215 and they remain in mesh even when carriage 209 is in its normal position, as may be seen in FIG. 4. A C-shaped snap ring 223 is seated in an annular or circumferential groove of shaft 186 to retain shaft 221 and gear 222 in position. A plastic cam 225 is loosely mounted over shaft 221 in order that the shaft may be rotated without rotating the cam. However, cam 225 is mechanically coupled to shaft 221 by a slip-clutch device that causes the cam to pivot or rock in response to the initial rotation of fine shaft 221, whether it be in a clockwise or counterclockwise direction. Specifically, a safety pin type clutch spring 226 is positioned in an annular groove 221a formed in metallic shaft 221. An upper portion of the clutch spring seats in and is retained by a slot formed in a projecting portion 225a of cam 225. Clutch spring 226 exerts pressure on groove 221a, namely a radially inward force, to introduce sufficient friction so that initial rotation of shaft 221 causes spring 226, and consequently cam 225, to pivot from its home position (shown in FIGS. 2, 3 and 4) in the direction in which the shaft is rotated. For example, in response to initial counterclockwise rotation of shaft 221 by the operator spring 226 and cam 225 pivot or rock in a counterclockwise direction.

The top of cam 225 (as viewed in FIG. 5) is V-shaped to present a pair of converging camming surfaces 225b and 225c. Pin 209a extends into that V and normally lies at the vertex thereof. When cam 225 is pivoted counterclockwise, surface 225c cams and pushes pin 209a upwards and against the tension of spring 219. Carriage 209 thus moves upwardly and pinion 214 is shifted into engagement with the tuning screw 201 of the effective oscillator coil 141. Upward movement of pin 209a ceases when pinion 214 meshes with the tuning screw and pinion 215 is fully in mesh with gear 222. The uppermost position of pin 209a is shown in FIG. 5, and in that position pin 209a abuts and serves as a stop against cam surface 225c to hold cam 225 in its FIG. 5 position and prevent further counterclockwise pivoting thereof in response to continued counterclockwise rotation of fine tuning shaft 221. Clutch spring 226 will now slip in groove 221a thus permitting gear 222 to continue to rotate while cam 225 remains fixed in position. As a consequence, pinion 215 rotates in a clockwise direction and this in turn causes pinion 214 to screw the tuning slug 201 further into the effective coil 141.

When the counterclockwise rotational force is removed by the operator from shaft 221, pin 209a, under the tension of spring 219, now acts as a cam and urges cam 225 to its home position. Of course, subsequent clockwise rotation of shaft 221 initially causes clockwise rocking of cam 225 in order that camming surface 225b pushes pin 209a upward to effect engagement of pinion 214 and screw 201. Continued clockwise rotation of shaft 221 effects counterclockwise rotation of pinion 215 to cause pinion 214 to draw the tuning screw 201 away from the effective oscillator coil.

Preferably, elements 221, 222, 223, 225 and 226 are preassembled to shaft 186 before the shaft is added to the tuner and affixed to the hub of rotor 172. Of course, if shaft 186 is to be connected to rotor 171 (as shown in dashed construction by shaft 186' in FIG. 3), a shorter dummy shaft may be inserted into the hub of rotor 172 to provide support for elements 221–226. Separating the channel selector and fine tuning shafts and using nonconcentric control knobs has its advantages. For example, the possibility of inadvertently disturbing the fine tuning setting when the channel selector knob is rotated is minimized.

Kickout cam 206 is provided merely as a precaution to make certain that pinion 214 is always disengaged from the tuning screws 201 when VHF channel selector shaft 186 is manipulated. As best seen in FIG. 6, when the fine tuning control is actuated by the operator and carriage 209 is moved to its uppermost position to effect meshing of pinion 214 with the tuning screw of the effective coil 141, the pointed portion 209b of the carriage nests or seats in one of the thirteen notches around the periphery of kickout cam 206. Before another channel is selected by the operator, fine tuning shaft 221 will have been released and spring 219 will ordinarily have caused disengagement of pinion 214 from the tuning screw. In the event, however, of malfunctioning and disengagement does not actually take place, when the channel selector shaft 186 is subsequently rotated cam 206, which is fixed to and rotates with shaft 186, will cam or push portion 209b downwardly to effect the required disengagement.

A small partition 231 affixed to the inside of housing wall 160e provides a shield for the oscillator coils 141.

Since each of rotors 170 and 172 contains a vacant well, rotor contacts for those empty wells are not needed and have been omitted in the drawings. As a practical matter, however, such contacts would be mounted on rotors 170 and 172 even though they would be electrically isolated and serve no electrical function. In other words, every one of the 26 lobes on each of rotors 170 and 172 would support a contact. This is desirable to avoid contamination of the stator contacts (particularly if they include gold inlays) that may otherwise occur from engaging the plastic material of which the rotors are constructed. Preferably, the stator contacts should engage only the rotor contacts to avoid the possibilities of metal contamination and consequent faulty tuner operation.

The invention, as shown by the embodiment of FIGS. 1–13, thus provides a complete step-by-step RF tuner for tuning a television receiver to any selected one of the twelve VHF channels. All of the desirable features and advantages customarily found in prior turret type tuners are also present in applicant's tuner, in addition to other features and advantages totally absent in those prior tuners. The performance, ruggedness of construction, parts standardization and reliability of applicant's tuner is superior to that of any other prior tuner, be it of the turret or bandswitch or hybrid type.

Of substantial importance are the manufacturing economies realized by applicant's tuner. Note that relatively few parts are needed. Most of the tuner parts can easily and inexpensively be made by mass production techniques. In fact, the entire tuner construction lends itself to automated fabrication and mechanization, requiring almost negligible handling and hand operations. Because of applicant's unique structural concept, a relatively insignificant amount of hand labor is needed in the manufacturing process and labor costs are minimized.

Figure 14:
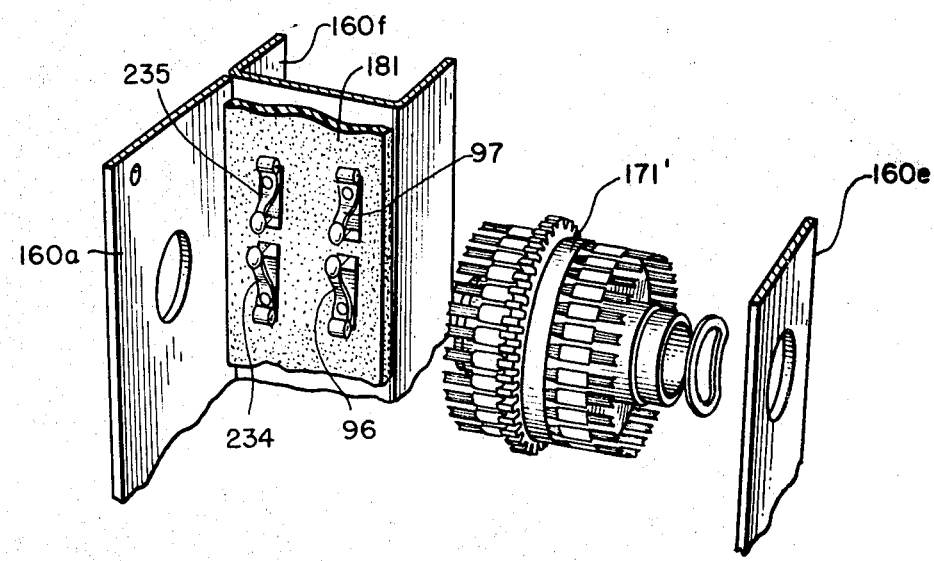
FIG. 14 shows a portion of the VHF tuner modified in accordance with another embodiment of the invention.
Figure 15:
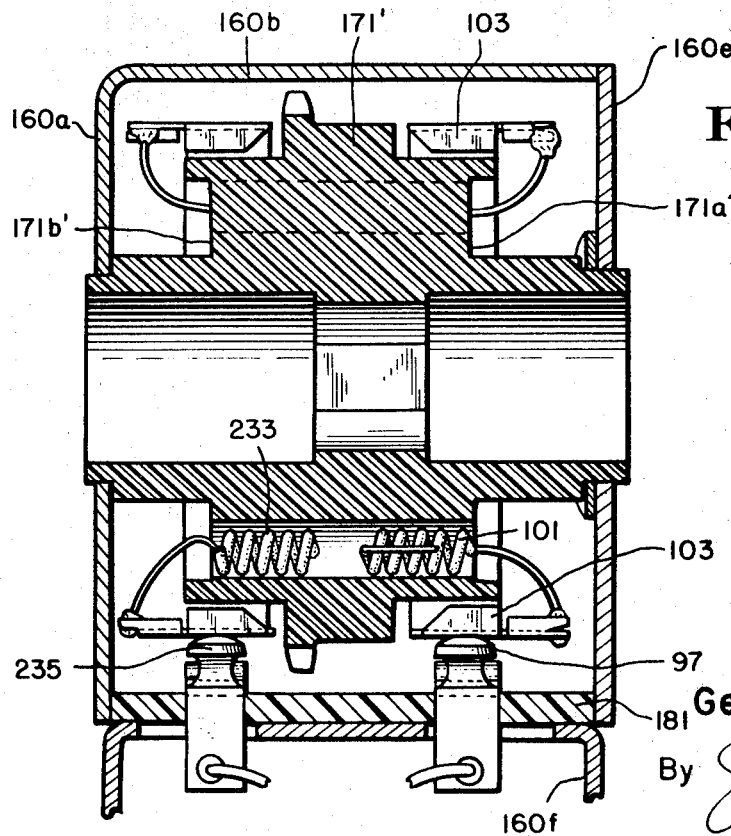
FIG. 15 is a sectional view of the modified VHF tuner.

The skirt selectivity of tuner 20 may be increased in well known manner by employing four rather than three tunable circuits. The circuit of FIG. 1 could easily be modified to include a double-tuned interstage coupling network (instead of the single tuned circuit shown) from the output of the RF amplifier to the input of the mixer. In each tuner position, four coils would then have to be selected, two of which (those tuning the interstage network) would have to be inductively coupled to each other. Applicant's tuner may easily be converted to one having four tuned circuits as shown in the embodiment illustrated by FIGS. 14 and 15. Rotor 171 is substituted by rotor 171' whose overall length is equal to that of rotor 171. Unlike rotor 171, the thirteen cavities of rotor 171' for accommodating the coils 101 constitute bores each extending through the rotor from face 171a' to face 171b'. The thirteen coils of the fourth group (i.e. the group not present in the embodiment of FIGS. 1–13) are disposed in the left halves (as viewed in FIG. 15) of respective ones of the thirteen bores. One of these coils, designated by the numeral 233, is shown in FIG. 15. Note that the two coils shown in FIG. 15 are mutually intercoupled, as is required since each forms part of a respective one of the two tuned circuits in the double-tuned interstage coupling network. The fourth group of coils are connected to rotor contacts secured to the periphery of rotor 171' and thes coils are connected, one at a time, to an additional pair of stator contacts 234, 235 mounted on insulator 181 to selectively incorporate those coils into their associated tuned circuit.

It is to be noted that the spacing between support plates 160a and 160e is the same in both embodiments. With the exception of stator contacts 234 and 235 and rotor 171', the physical parts of the two tuners are identical. Once again, this lends itself to manufacturing economies. Conversion from three to four tuned circuits, or viceversa, can be made primarily by replacing the turret containing the interstage coils 101.

The invention provides, therefore, an RF tuner the manufacture of which may be highly automated. Applicant's tuner construction achieves a degree of quality combined with manufacturing economies not attained heretofore.

Certain features described in the present application are disclosed and claimed in the following two copending applications filed concurrently herewith: Ser. No. 718,840, filed in the names of Joseph M. Van Baalen and Robert E. Mudra; and Ser. No. 718,786, filed in the names of George R. Dickinson and Howard C. Grossenheider, both of which are assigned to the present assignee.

While particular embodiments of the invention have been shown and described, modifications may be made, and it is intended in the appended claim to cover all such modifications as may fall within the true spirit and scope of the invention.

I claim:

1. A multi-position step-by-step RF tuner for tuning a television receiver to any selected one of a plurality of television channels, comprising:

a rotatably mounted rotor, constructed of insulating material, having first and second faces normal to its axis of rotation, having a plurality of wells each extending in the direction of the rotor's axis and each well having an opening on said first face, and further having its periphery notched to provide a plurality of substantially flat-topped lobes;

a plurality of rotor contacts each of which is mounted on a respective assigned one of said lobes and each presenting a substantially flat gold inlay contact surface parallel to the rotor's axis;

a plurality of inductance coils, each having two terminal leads, disposed in respective assigned ones of said wells;

each coil having both of its leads extending through the opening, on said first face, of its associated well and being electrically connected to different assigned ones of said rotor contacts;

each of said rotor contacts having a projecting portion that extends out from and beyond said first face to facilitate dip soldering of the terminal leads to their assigned rotor contacts;

means, including a rotatable channel selection tuning shaft mechanically coupled to said rotor, for effecting step-by-step rotation of said rotor from one to another of a plurality of different predetermined angular positions;

and a stator assembly including a pair of stressed cantilever mounted resilient metallic stator contacts the free ends of which have gold inlay spherical contact areas that are urged toward and engage, at point contacts, the flat contact surfaces of a different pair of said rotor contacts in each of said angular positions of said rotor to selectively render said coils effective to achieve tuning of the television receiver to different ones of the television channels;

each of said cantilever mounted stator contacts being tapered between a fixed portion thereof and its spherical contact area to achieve uniform stress loading thereby to minimize metal fatigue and each of said stator contacts also being at least partially folded back on itself to minimize its inductance.

References Cited

UNITED STATES PATENTS

| | | | |
|---|---|---|---|
| 1,405,338 | 1/1922 | Schon | 200—26 |
| 2,356,229 | 8/1944 | Dunlap et al. | |
| 347,642 | 8/1836 | Ripley | 200—26 X |
| 1,913,617 | 6/1933 | Smith | 200—8 X |
| 1,971,872 | 8/1934 | O'Brien | 200—8 X |
| 2,037,457 | 4/1936 | Colson | 310—219 |
| 2,501,456 | 3/1950 | Thias et al. | 200—8 |
| 2,643,361 | 6/1953 | Mackey | 336—142 |
| 2,795,660 | 6/1957 | Keller et al. | 200—8 |
| 2,868,982 | 1/1959 | Carlson | 334—51 |
| 3,148,345 | 9/1964 | Moran | 334—51 |
| 3,210,485 | 10/1965 | Ma | 334—50 X |
| 3,218,589 | 11/1965 | Delp | 334—51 |
| 3,356,972 | 12/1967 | Rieth | 334—49 |

HERMAN KARL SAALBACH, Primary Examiner

W. H. PUNTER, Assistant Examiner

U.S. Cl. X.R.

334—51, 57